United States Patent [19]
Coston

[11] 4,029,059
[45] June 14, 1977

[54] OSCILLATING PISTON ROTARY MACHINE

[76] Inventor: Semer H. Coston, 17052 Bernardo Oaks Drive, San Diego, Calif. 92128

[22] Filed: Jan. 20, 1975

[21] Appl. No.: 542,285

[52] U.S. Cl. .............................................. 123/18 R
[51] Int. Cl.² ......................................... F02B 53/00
[58] Field of Search ............ 123/18 R; 91/223, 339, 91/177, 266; 92/67, 122, 120

[56] References Cited

UNITED STATES PATENTS

| 638,570 | 12/1899 | Forsyth ................................. 123/18 |
| 1,144,105 | 6/1915 | Brown .................................... 123/18 |
| 2,127,743 | 8/1938 | Linthwaite ............................. 123/18 |
| 2,389,764 | 11/1945 | Chard ..................................... 123/18 |
| 2,968,290 | 1/1961 | Bradshaw .............................. 123/18 |
| 3,190,270 | 6/1965 | Peterson ................................ 123/18 |
| 3,702,746 | 11/1972 | Parmerlee ........................ 123/18 X |

FOREIGN PATENTS OR APPLICATIONS

| 1,626,531 | 1/1971 | Germany ................................ 123/18 |
| 2,018,811 | 11/1971 | Germany ................................ 123/18 |

Primary Examiner—Charles J. Myhre
Assistant Examiner—W. Anderson
Attorney, Agent, or Firm—C. B. Messenger

[57] ABSTRACT

In a four stroke cycle reciprocating internal combustion engine, four dual functionable combustion chambers and two power trains to crankshaft are comprised of a single stationary cylinder encasing two quadruple faced rotor-reciprocative pistons, further encasing a rotatable intake-exhaust manifold geared to an external rotatable crankshaft. The crankshaft is connected by connecting rods to driving arms on external extensions of the two pistons.

Two such units connect to a common crankshaft to comprise an eight combustion chamber engine.

Upon each crankshaft half turn stroke the two pistons of a unit and associated intra-engine power trains to the crankshaft move simultaneously in opposed directions to expand two chambers for intake and combustion and to contract the other two for compression and exhaust functions. On each successive stroke the pistons reverse directions, the chambers reverse expansive and contractive actions, and the manifold rotates one quarter turn to advance each function to the succeeding chamber. In the dual opposed piston and power train action, each piston serves as a working compression head for the other, thus providing a high work to low heat loss ratio for the chambers and a high degree of balance with low friction to the engine bearings. A highly turbulent fuel-air mixture injected toward the hot area that bounds each spark plug assures a high percent of fuel burn with minimal air pollution.

18 Claims, 26 Drawing Figures

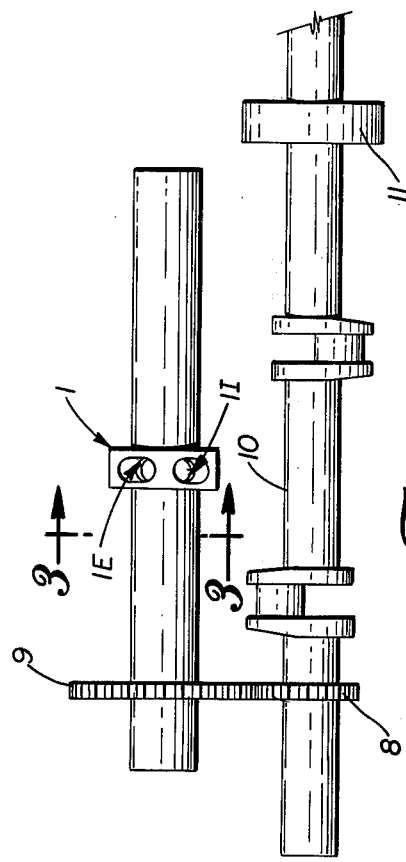
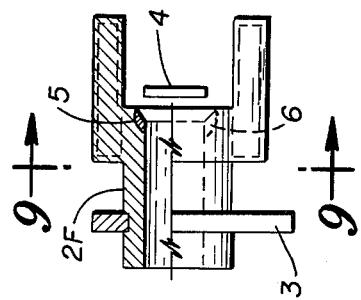
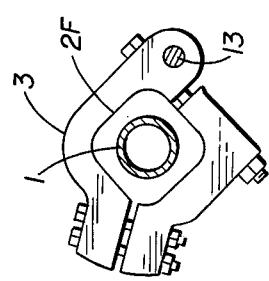
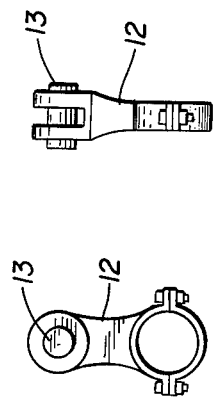
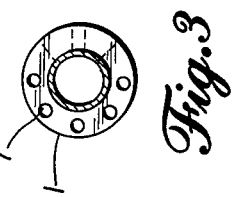
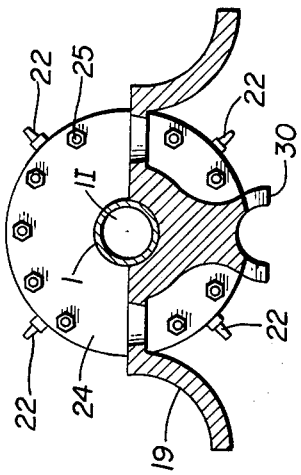
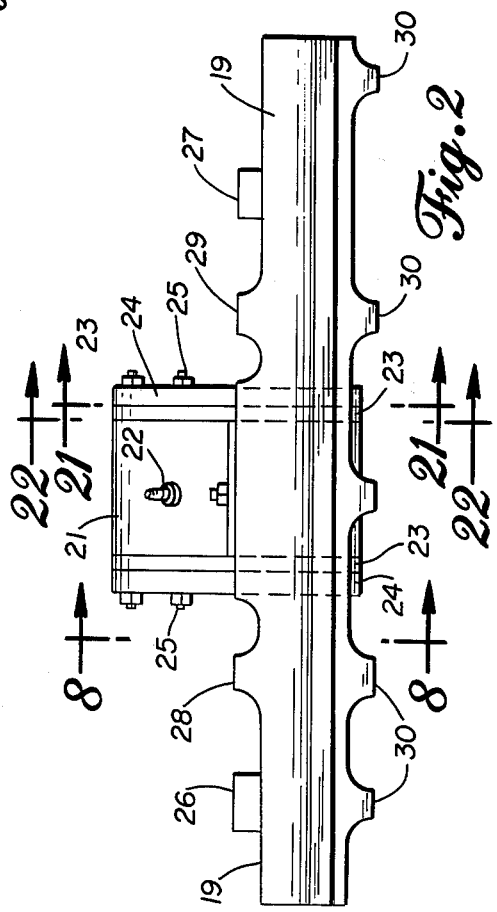

OSCILLATING PISTON ROTARY MACHINE

This invention relates generally to reciprocating internal combustion engines and particularly to four stroke cycle rotor-reciprocating, spark plug ignition internal combustion engines. Four stroke cycle engines have been in use for many years, either as stationary power plants or in moving vehicles. Regardless of success, the high fuel consumption by and the high air pollution from such engines commands decisive improvement in both catagories, which is the general purpose of this invention.

By nature of design the engine covered by this invention, which will be referred to in this specification as the new engine, must be provided in four combustion chamber increments; and to point out elements of invention, one increment is described and is compared to a familiar old type four cylinder in line, poppet overhead valve, four stroke cycle, internal combustion engine, which will be referred to as the conventional engine. Each engine has four combustion chambers and works on a four stroke cycle, with one half turn of the crankshaft to a stroke and two full turns of the crankshaft to an engine cycle.

The conventional engine has four each of pistons and connecting rods; eight each of valves, valve lifters, push rods and rocker arms; a camshaft and a crankshaft; to total forty two major working parts. The new engine has two piston units, two driving arms, two connecting rods, a rotary manifold and a crankshaft for a total of eight parts to perform comparable functions.

It is, therefore, an object of this invention to provide a four stroke cycle internal combustion engine simpler in construction and with less friction surface than in such engines heretofore provided.

In the conventional engine, air and fuel mixture intake is directed through a multi-branch manifold, which at best can be engineered for equal fuel mixture distribution to the chambers at a particular engine speed. And further, as the mixture rushes down into a cylinder behind the moving piston, the atomized fuel is, by inertia, somewhat separated from the lighter air as the inrush is suddenly stopped. This causes richer mixtures or condensed fuel accumulation in the chamber in the lower area at the piston, and leaner mixtures in the upper area at the spark plug.

In the new engine, a single rotating manifold assures equal distribution of fuel mixture to all chambers at any speed. The mixture turns into each chamber against an exhaust heated surface in the manifold which aids fuel vaporization, and any fuel separation by inertia will direct the richest mixture to the vicinity of the spark plug where atomized particles are further vaporized by impact on the heated cylinder walls.

These factors along with the high turbulence of the mixture leaving the rotating manifold facilitate an adequate lean adjustment common to all chambers, and aid in assuring positive ignition and more complete combustion upon ignition than in conventional engines.

It is, therefore, an object of this invention to provide means for more uniform distribution of fuel mixtures to the engine combustion chambers than heretofore provided, and for accumulation of rich and well vaporized mixture within each chamber to be at the spark plug location to assure a high percent of fuel burn and minimal exhaust pollution.

In a fully compressed combustion chamber of the conventional engine the working piston face area is smaller than the higher heat loss fixed cylinder head and cylinder wall abutment area, and this holds true with increasing ratio during a combustion stroke. There is no fixed head in the new engine, as the chamber is enclosed at both ends by two opposed piston faces which simultaneously move out from the force of combustion, and the higher heat loss fixed abutment surface is confined to the chamber walls only. At full compression, the piston working surface within the chamber is much greater than chamber wall abutment surface, and will average greater through the length of the stroke. It is obvious, therefore, that higher work and lower heat loss ratios prevail in the new engine with the dual action chambers.

It is, therefore, also an object of this invention to provide combustion chambers which perform with higher work and lower heat loss ratios, and thus, more efficiently than those in conventional engines.

The force from each power stroke in the conventional engine is in one direction only, down against the crankshaft at its crank locations. This exerts high friction and wear to the lower section of all main bearings and to the upper section of all connecting rod bearings.

In the new engine, the dual opposed pistons are connected through two separate trains to opposed cranks of the crank shaft, which directs simultaneous balanced down push and up pull forces to the crankshaft on each stroke. This action exerts exceptionally low stress and friction forces to all crankshaft main bearings, with equal friction distribution over a cycle to upper and lower sections of all engine bearings.

It is, therefore, an object of this invention to provide piston to crankshaft power trains with better balance and less main bearing friction than in those of conventional engines, and to more widely distribute the friction load over all engine bearing surfaces.

It is also an object of this invention to include anti-fire over chambers in each piston to prevent fire over in the engine from one combustion chamber to another, this being a requirement peculiar to the new engine.

The spring loaded poppet valves of a conventional engine comprise a limiting factor in its running speed. The speed capability of the oil cooled rotary manifold used for the same function in the new engine will not be limiting, and higher speeds up to the limits of other parts may be obtained. Also, in the conventional engine, the volume of displacement in chambers upon a cycle of combustions is limited to the total volume through which a piston moves in all cylinder chambers. In the new engine, the total volume of displacement on a cycle is considerably in excess of the volume within the cylinder divided into the four chambers. This is accomplished by each chamber, upon expanding, overlapping the boundaries of preceding and succeeding chambers which simultaneously are contracting. High speed and high volume of combustion expansion contribute to high horsepower.

It is, therefore, also an object of this invention to provide an engine with high horsepower to low weight ratio, as compared to conventional engines.

The drawing and description in this specification cover a single four combustion chamber unit as the most practical manner of pointing out all elements of invention. The provision of multiple unit engines does not not depart from the intent and purpose of this invention.

It is, therefore, an object of this invention to provide a multiple, two unit, engine with a total of eight combustion chambers.

The foregoing objects and features as well as others of this invention will be more apparent from a consideration of the subsequent description and — the appended drawings.

BRIEF DESCRIPTION OF THE DRAWINGS

FIG. 1 is a side elevation of major components of the invention disposed in interworking relationships, FIG. 2 is a side elevation of engine frame and support components of the invention, FIG. 3 is a cross-sectional elevation taken along the line 3—3 of FIG. 1, FIG. 4 is a front elevation of a left or front piston assembly as used in this embodiment of the invention, FIG. 5 is a side elevation of such piston in partial section, FIG. 6 is a front elevation of a connecting rod as used to interconnect pistons and crank shaft, FIG. 7 is a side elevation of said connecting rod, FIG. 8 is a cross-sectional front oriented elevation taken along the line 8—8 of FIG. 2 showing features of the engine frame and support components.

DESCRIPTION OF THE PREFERRED EMBODIMENT

Figure 9:
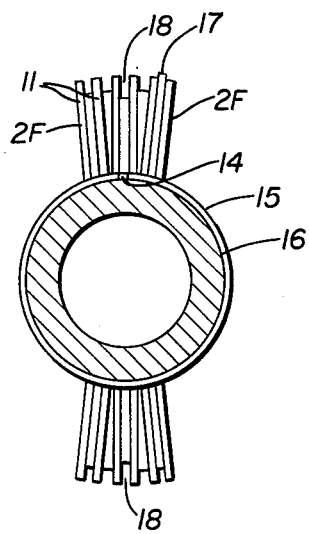
FIG. 9 is an enlarged cross-sectional front oriented elevation of a piston assembly taken along the line 9—9 of FIG. 5.
Figure 10:
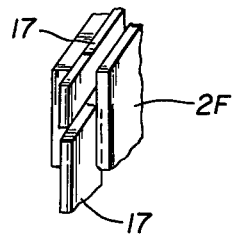
FIG. 10 is an enlarged perspective illustration showing features of the compression vanes 17 used with the pistons of FIGS. 5, 9 and 24.
Figure 11:
FIG. 11 is a top view of the top vanes for said piston.
Figure 12:
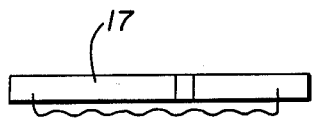
FIG. 12 is a side view of the vanes shown in FIG. 11, FIGS. 13 through 20 are front oriented schematic type elevations showing the sequential movement patterns for the piston assemblies 2F and 2R as they are moved in oscillating pattern about the intake-exhaust manifold 1 and within the cylinder 20 to define separate combustion chambers C1–C4 that are of progressively and cyclically varying volume.
Figure 21:
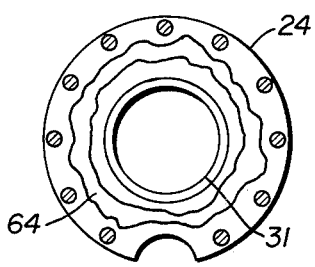
FIG. 21 is a front oriented elevation taken along a case line 21—21 of FIG. 2.
Figure 22:
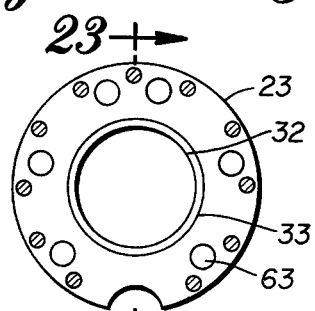
FIG. 22 is a front oriented elevation taken along the case line 22—22 of FIG. 2 to show feature of the cylinder chamber end plates.
Figure 23:
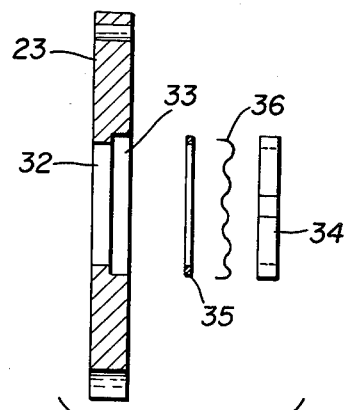
FIG. 23 is a cross-sectional side oriented elevation taken along the line 23—23 of FIG. 22 showing components associated with the end plates in disassembled relationship.
Figure 25:
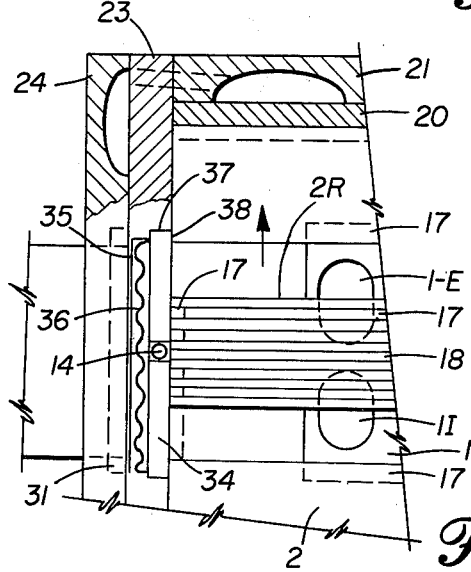
FIG. 25 is an enlarged partial side elevation with portions shown in broken cross-section showing the disposition of the piston assembly 2R within the cylinder chamber 20.
Figure 26:
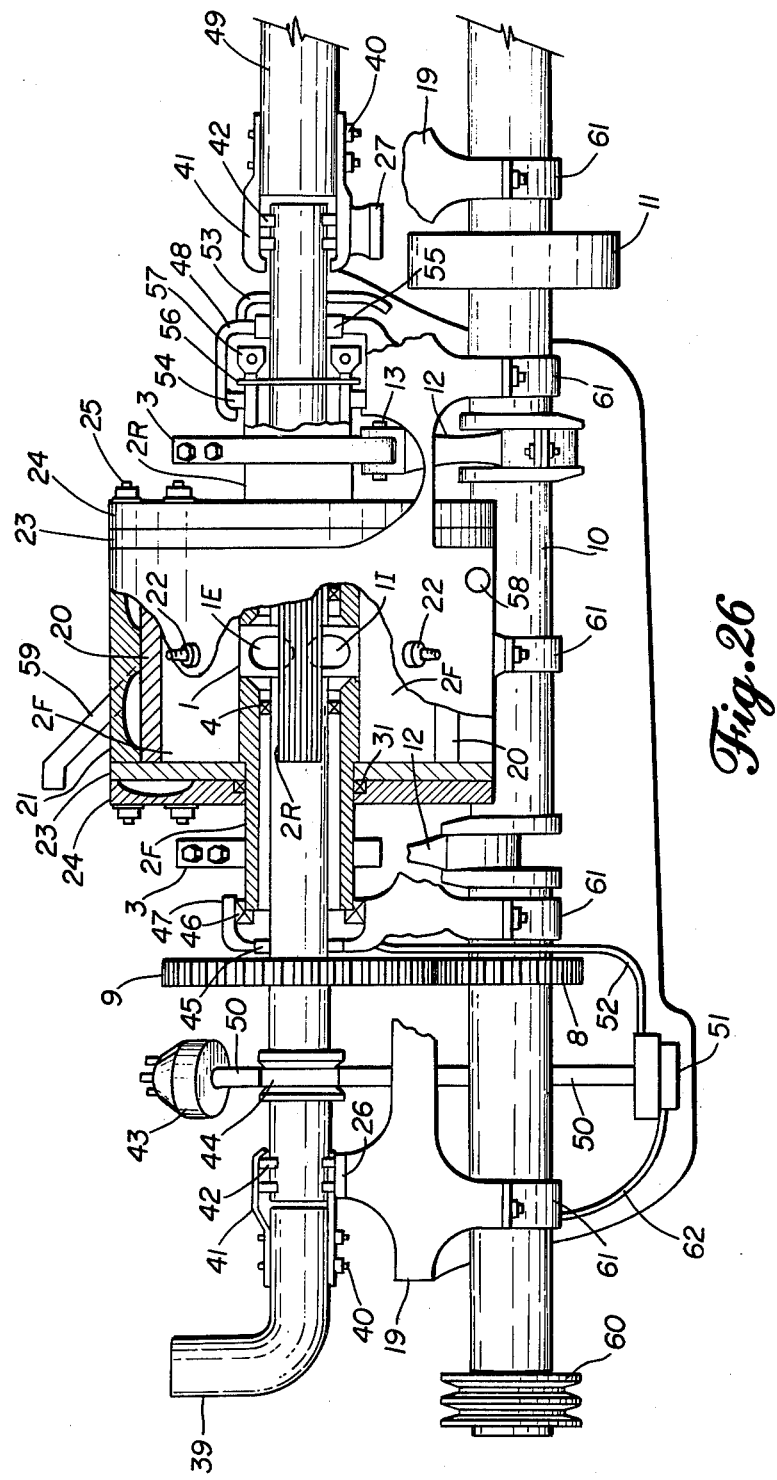
FIG. 26 is a side elevation of an assembled engine embodiment of the invention with portions thereof being presented in broken and cross-section detail to show the interworking disposition of the piston assemblies 2R and 2F when disposed within the cylinder chamber 20 for cooperative oscillating motion about the intake-exhaust manifold 1.

With reference to FIGS. 1, 26, 3, 4 and 9, it will be seen that intake-exhaust manifold 1 provides an intake tube passage from the intake pipe 39 at the front of the engine to the port 1I at the enlarged center section with an exhaust port 1E and exhaust passage extending from such enlarged center section rearwardly to the exhaust pipe 49 at the rear of the engine. — A hollow shaft piston 2F with an opposed pair of welded on vanes is at the front and a similar piston 2R with vanes is at the rear. Two driving arms 3 are attachable to the pistons. A manifold to piston stabilizing bearing 4 is provided in each piston unit. Multiple oil by-pass vents 5 are in each piston sleeve. Bevel 6 is in each piston sleeve to prevent blockage of manifold oil ports. Oil ports 7 are in the manifold. Crankshaft gear 8 drives manifold gear 9. Crankshaft 10 is provided with flywheel 11. There are two each of connecting rod 12 and wrist pin 13, a set for each, front and rear, crank position. FIG. 9 includes a compression seal driving stud 14, outside surface of piston tube within combustion chambers 15, outside surface of piston tube 16 extending out of combustion chambers. A pair of compression details with a spring expander 17 is provided for each straight line compression slot in the piston vanes. An anti-fire over chamber 18 extends around all edge faces of each piston vane. All items and reference points apply to each piston. FIGS. 2, 8, 22 and 21 include the following: An engine frame with lower section of water jacket 19. A cylinder 20 which is obscured from view but shown in FIGs. 25 and 26. The top section of water jacket 21, four spark plugs 22, two chamber end plates 23, two water jacketed piston bearing mountings 24 and assembly bolts and nuts 25. Rubber mounted manifold to pipe junction supports 26 and 27 are shown at front and rear respectively. Piston and manifold bearing housings 28 and 29 are shown at front and rear respectively, and crankshaft main bearing housings 30 are shown in the lower section. FIGS. 22 and 21 show piston inner bearing 31, end plate piston clearance hole 32, enlarged section of hole 33, piston tube compression seal ring 34, friction washer 35 and spring washer 36. FIG. 25, items 37 and 38 will be described under detailed description of that figure. FIG. 26 comprises, in addition to the foregoing parts, intake pipe 39, four U bolt assemblies (2 front and 2 rear) 40, front and rear manifold to pipe junctions 41, four junction ring seals 42, distributor 43, geared type belt 44, manifold front bearing 45, front piston thrust bearing 46, front bearing cap 47, rear bearing cap 48, exhaust pipe 49, oil pump shaft 50, oil pump 51, low pressure oil kine 52, oil return line 53, rear piston bearing 54, rear manifold bearing 55, piston thrust washer 56, thrust springs 57, coolant intake port 58, coolant outlet port 59, utility pulley 60, five main bearing caps 61, high pressure oil line 62, and coolant passages 63 and 64 shown in FIGS. 22 and 21.

ASSEMBLY - FIG. 26

Piston units 2F and 2R are slipped over manifold 1 to its larger center section. The two slots on each side of the anti-fire over chamber in each piston vane shown in FIG. 9 are equipped with paired details 17 and associated expansion spring, totaling sixteen sets. Sixteen sets of similar but shorter details are slipped into the opposite inner vane slots shown in FIG. 5, part 2F.

Thirty two sets of similar but still shorter details are slipped into the vane end slots shown in FIG. 5, part 2F. Cylinder 20, which is equal in length to the combined larger diameter sections of the two pistons and the center larger section of the manifold, is slipped over to encase these sections. In referring to FIG. 25, end plates 23 are each equipped with a compression ring 34 in compartment 33. These ring seals are tensioned out to clear the outer piston shaft and to assure friction seal at surfaces 37 and 38. The end plates are installed with the piston stud 14 aligning between the ends of each circular seal 34. Washers 35 and 36 are installed as shown, and bearing housings 24 with bearings 31 are installed at each end. Thus, details 17 on each of the four sides of each piston vane and surfaces 37 and 38, as applied to both pistons 2F and 2R, complete the combustion chamber seals.

Referring again to FIG. 26, gears 8 and 9 are added and the cylinder and assembled parts are placed into bearings 45, 46, 54 and 55 and all parts external to the cylinder are assembled.

Distributor 43, drive 44, shaft 50, oil pump 51, pulley 60 and oil line 61 are all parts or assemblies of conventional types, and are shown, in part, to illustrate a manner of adapting these essential units to the engine.

The foregoing description covers a single increment engine with one cylinder divided into four combustion chambers C1, C2, C3 and C4 which also represents the firing order as described in FIGS. 13 through 20 which provide a mode of operation section. The inclusion of a second identical increment, less the crankshaft 10, flywheel 11 and gear 8, and designating chambers C5, C6, C7 and C8 is readily adaptable and confined to the principles set forth in this invention. In this arrangement, the axis of the second cylinder increment is parallel to that of the first increment shown in FIG. 13, and located 90° clockwise around the crankshaft axis. It is set back a distance equal to the width of a connecting rod at the crank, and the corresponding connecting rods of the two increments share the same crank of the crankshaft. The crankshaft gear 8 is positioned to drive both increment manifold gears 9. The intake and exhaust manifold pipes branch equally to the two increments. This comprises an eight combustion chamber four stroke cycle reciprocating engine with all the foregoing described features, having a firing order of C1, C5, C2, C6 C3, C7, C4 and C8.

MODE OF OPERATION

Figure 13:
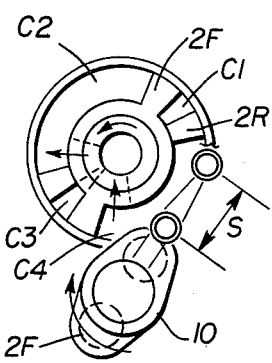
Figure 14:
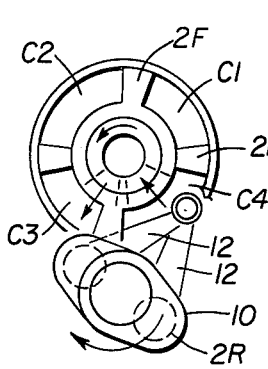
Figure 15:
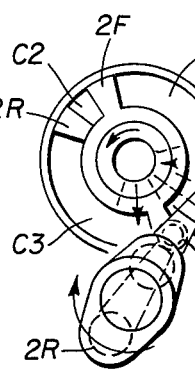
Figure 16:
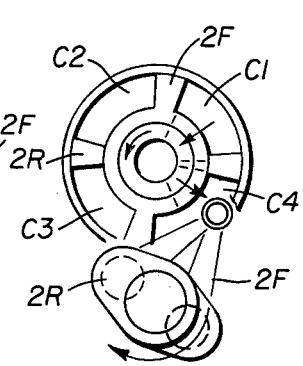
Figure 17:
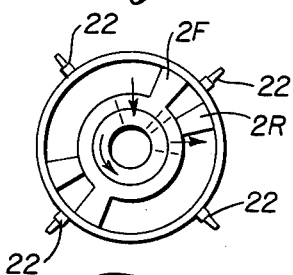
Figure 18:
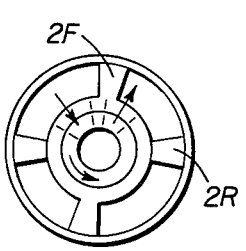
Figure 19:
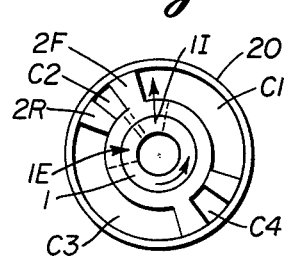
Figure 20:
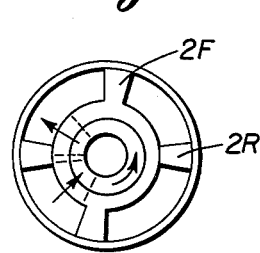

FIG. 13 is a front view schematic representation of the working chambers. The view is repeated in FIGS. 14 through 20 in one quarter crankshaft turn steps to depict the position of working parts at these steps over a complete two crankshaft turn engine cycle. Crankshaft and connecting rods which would be in the same positions as shown, respectively, in FIGS. 13 through 16, have been omitted from FIGS. 17 through 20. Spark plug locations are shown in FIG. 17, and all other parts and chambers are identified in FIG. 19. Through gears, which along with cylinder end plates have been omitted to display the other parts, the intake-exhaust manifold 1 turns counter clockwise one quarter turn to every clockwise half turn stroke of the crankshaft 10. Manifold intake is from the front and is depicted by an arrow pointing to a chamber. Exhaust is out the rear end (obscured from view) and is depicted by an arrow pointing from a chamber to the manifold. Intake and exhaust timing and duration depicted is typical only and may be varied to meet specific nominal engine speed and fuel octane requirements. The dimension "S" in FIG. 13 represents the stroke length as the front and rear connecting rod wrist pins exchange push and pull positions in steps from FIG. 13 to FIG. 15.

Upon two successive strokes of the previous cycle in FIGS. 17 through 20, fuel mixture was drawn into and compressed in chamber C1 between vanes as shown in FIG. 13. Upon spark plug ignition and combustion, a stroke begins by outward movement of the vanes through FIG. 14, to full expansion of the chamber and end of the stroke in FIG. 15. It will be noted that the exhaust port engages the chamber after mid-stroke in FIG. 14 and before the end of the stroke in this typical timing arrangement.

Simultaneous with this stroke, intake, exhaust and compression functions take place in chambers C3, C4 and C2 respectively. At the beginning of each of the subsequent three strokes of the engine cycle, combustion occurs in chambers C2, C3 and C4 in stroke order, and simultaneous with each stroke the intake, exhaust and compression functions each advance one chamber under control of the revolving manifold.

It will be further noted that intake of fuel mixture bends sharply into the chamber at the hottest surface of the manifold, which aids fuel vaporization, and sweeps the chamber while moving toward the cylinder inner wall and spark plug. Any remaining unvaporized particles, because of the greater density, somewhat separates from the air and is carried by inertia to the wall. Since these fixed abutment walls near the spark plug become the hottest surfaces in engine operation, the fuel on impact will further vaporize to aid combustion which follows the compression stroke and ignition.

Any slight compression leak during combustion in a chamber is trapped, for later release to the exhaust port, into the anti-fire over chamber of the vane separating that chamber from the succeeding chamber which is compressing the next combustable charge. See FIG. 9, 18. This serves as a guard against pre-ignition of the next chamber.

Figure 24:
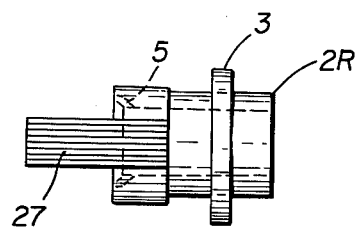
FIG. 24 is a side oriented view of the right piston assembly 2R which is mounted for oscillating movement about the intake-exhaust manifold 1 in cooperative position with respect to the piston assembly 2F of FIG. 5.

In referring to FIG. 26, a nearly constant flame expels out exhaust port 1E as the combustion chambers fire in order. Oil, from pump 51, through tube 52 passes through the piston tubes 2F and 2R over the manifold and through return tube 53 to maintain proper temperatures. See, also, oil passage vents 5, 6 and 7 in FIGS. 5, 3 and 24.

The rubber mounted supports 26 and 27 in FIG. 26 support the manifold pipe junctions 41 with flexibility to minimize stress on the ring seals 42 and the piston and manifold bearings 45, 46, 54 and 55.

CONCLUSION

While the components and combinations in my invention have been described with reference to a particular embodiment in an internal combustion engine, it is to be understood that such an embodiment is intended merely to be illustrative, and that other arrangements may be devised by those skilled in the art without departing from the spirit and scope of the invention. For example, the engine shown could serve as one operating on the diesel principle by making slight changes.

What is claimed is:

1. A rotary machine of oscillating piston type comprising a hollow shaft, means for mounting said hollow shaft for full circle rotation about its axis, divider means within said shaft to provide separate inlet and outlet passages therein, an enclosing structure disposed about said shaft having continuous chamber defining walls positioned as generatrices about the axis of said hollow shaft, a plurality of independently movable piston elements rotatably disposed on said hollow shaft and interiorally of said chamber walls for effectively dividing the space therebetween into a plurality of separate circumferentially disposed reaction chambers, said hollow shaft further providing separate port openings through the walls thereof at positions adjacent said separate piston elements for cyclical flow communication between said reaction chambers and the inlet and outlet passages of said hollow shaft as the shaft is rotated, and means for regulating the rotational movement patterns of said separate piston elements and said hollow shaft whereby adjacent pistons are oscillated one with respect to the other to effectively change the volumetric displacement of the defined reaction chambers disposed therebetween to provide intake and compression cycles with said piston elements and hollow shaft ports moving cooperatively toward an earlier open flow position when initiating said intake cycle.

2. The rotary machine as set forth in claim 1 wherein at least four reaction chambers are provided.

3. The rotary machine as set forth in claim 1 wherein said piston elements are of external shape corresponding to the shape of the chamber walls of said enclosing structure.

4. The rotary machine as set forth in claim 3 wherein said rotary machine is an internal combustion engine and said inlet and outlet passages are respectively the intake and exhaust therefor.

5. The rotary machine as set forth in claim 4 wherein said hollow shaft is adapted for full circle rotation whereby said intake and exhaust passages are successively interconnected to the separate defined reaction chambers in a full circle pattern during operations of said internal combustion rotary machine.

6. The rotary machine as set forth in claim 5 and further comprising an output shaft for said internal combustion rotary machine, and power transmission means interconnecting said hollow shaft and output shaft whereby said shafts are rotated at coordinated speeds.

7. The rotary machine as set forth in claim 6 wherein the rotational speed of said output shaft is twice the rotational speed of said hollow shaft whereby an internal combustion machine of four stroke cycle characteristic is provided.

8. The rotary machine as set forth in claim 6 wherein said means for regulating the movement patterns of said pistons is inclusive of a crankshaft that serves additionally as said output shaft.

9. The rotary machine as set forth in claim 8 wherein said means for regulating the movement patterns of said pistons is further inclusive of connecting rods interconnecting said crankshaft and piston elements.

10. The rotary machine as set forth in claim 9 wherein said power transmission means provides a two to one drive ratio between said output crankshaft and said hollow shaft whereby an internal combustion machine of four stroke cycle characteristic is provided.

11. The rotary machine as set forth in claim 9 and further comprising an ignition system for said internal combustion machine, and sparkplugs disposed through outer surfaces of said enclosing structure at positions radially outward from said hollow shaft and the inlet and outlet ports thereof.

12. The rotary machine as set forth in claim 11 and further comprising means providing a fuel/air mixture for said internal combustion machine for introduction through the intake ports of said hollow shaft whereby the introductory flow pattern for said fuel air mixture moves outwardly toward said sparkplugs.

13. An internal combustion engine of oscillating piston type comprising a hollow shaft, means for mounting said hollow shaft for full rotation about its axis, means within said shaft providing separate intake and exhaust passages therein, an enclosing structure disposed about said shaft having continuous chamber defining walls positioned as generatrices about the axis of said hollow shaft, a plurality of piston elements rotatably mounted on said hollow shaft and interiorally of said chamber walls, each of said piston elements having vane components thereon disposed at opposed positions with the vane components of one piston element being further disposed intermediate the vane components of a separate piston element for effectively dividing the space between said chamber walls and hollow shaft into a plurality of separate circumferentially distributed reaction chambers, a crankshaft for said engine disposed in non-concentric position with respect to said hollow shaft and further providing an output shaft for said engine, connecting rods interconnecting said crankshaft and each of said piston elements for moving said piston elements and the vanes thereof in an oscillating pattern whereby the volumetric displacement of adjacent defined reaction chambers is cyclically changed, said hollow shaft further providing separate port openings through the walls thereof at positions adjacent the vane components of said piston elements whereby changed pressure influences within said separate reaction chambers are cyclically communicated to the intake and exhaust passages of said hollow shaft as the shaft is rotated, and means providing a fuel/air mixture for said engine for introduction through the intake passages of said hollow shaft and cyclically to the separate reaction chambers of said engine whereby said fuel/air mixture is compressed for burning to provide output power from said engine.

14. The internal combustion engine as set forth in claim 13 and further comprising an ignition system for said internal combustion engine, and spark ignition means for said engine at positions communicating with the separate reaction chambers thereof whereby the introduced fuel/air mixture is cyclically ignited to provide output power for said engine.

15. The internal combustion engine as set forth in claim 14 wherein said spark ignition means is disposed through outer surfaces of said enclosing structure at positions radially outward from said hollow shaft and the inlet and outlet ports thereof whereby the introductory flow pattern for said fuel/air mixture moves outwardly toward said spark ignition means.

16. The internal combustion engine as set forth in claim 13 wherein the vane components of said piston elements are of external shape corresponding to the shape of the chamber walls of said enclosing structure and further comprising seal elements disposed on said vanes at all of the edges thereof for direct engagement with said chamber walls.

17. The internal combustion engine as set forth in claim 16 wherein separate seals are provided on said vane components at positions adjacent each of the separate defined reaction chambers on opposite sides of said vane components, said vane components further providing a recess area intermediate said seals for reception of gaseous materials passing either of said seals.

18. The internal combustion engine as set forth in claim 13 and further comprising power transmission means interconnecting said hollow shaft and crankshaft with a two to one drive ratio therebetween whereby said internal combustion engine is of four stroke cycle characteristic.

* * * * *